E. E. F. CREIGHTON.
MEANS FOR PROTECTING ELECTRIC SYSTEMS.
APPLICATION FILED MAY 13, 1912.
1,208,499.
Patented Dec. 12, 1916.
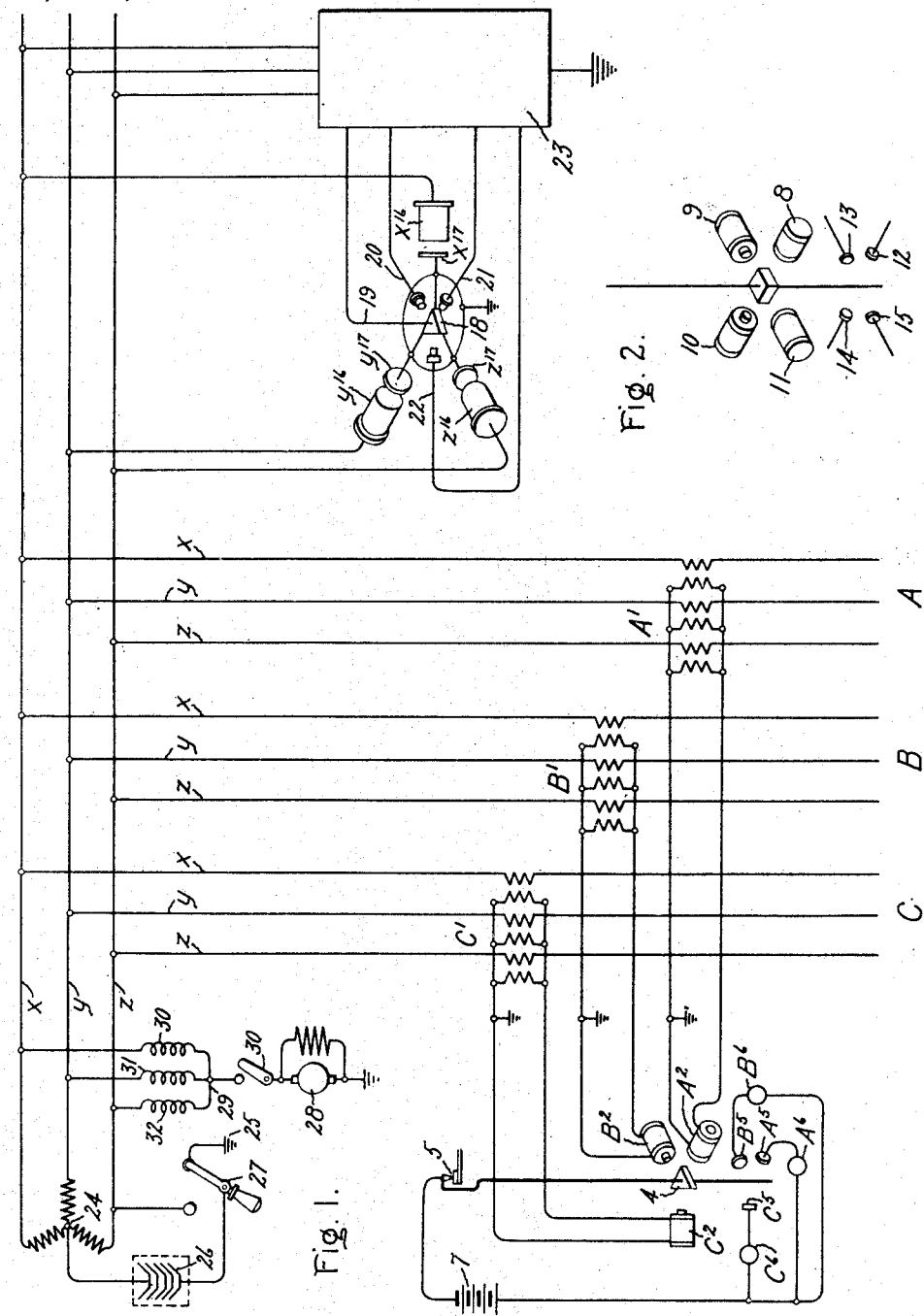

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

MEANS FOR PROTECTING ELECTRIC SYSTEMS.

1,208,499.  Specification of Letters Patent.  Patented Dec. 12, 1916.

Application filed May 13, 1912. Serial No. 696,930.

*To all whom it may concern:*

Be it known that I, ELMER E. F. CREIGHTON, a citizen of the United States, residing at Schenectady, county of Schenectady, State of New York, have invented certain new and useful Improvements in Means for Protecting Electric Systems, of which the following is a specification.

The object of my invention is to give greater continuity of electrical service from transmission lines.

The apparatus is particularly adapted to the conditions of multiple feeders that exist on nearly all large transmission systems.

In order to properly understand the function of the protective apparatus it is necessary to review the class of troubles that cause interruptions of service on electric systems, and the nature of the troubles. Trouble sometimes occurs by reasons of faults in cables which, though they may then exist in an embryonic state, are not developed by the necessarily brief high potential tests before installation, but develop only after installation and more or less use. Aside from the faults which may exist at such tests the methods of installing often introduce weak spots in the joints between the sections of the lines. These weak spots develop gradually into accidental grounds. Another source of weakness comes from electrolytic action on the sheaths of cables which finally bares the insulation to the deteriorating action of the surrounding elements. The production of these faults seems inevitable, although they can be minimized by careful work and selection of materials and rigid inspection.

My invention is adapted to protect a system grounded by the development of any of such faults or grounds produced in any other way.

There are certain effects produced when any fault develops into a grounded phase. The electrostatic capacity of the whole system is suddenly unbalanced, and there is a continual variation in these relations due to the arc at the fault. The surges that are thereby created course around the system, building up high resonant voltages in certain localities and damaging the insulation in general by the brush discharge resulting from the high frequencies. During this time of arcing ground, the station attendant is helpless. He knows that there is trouble but has no means of locating or suppressing it without disconnecting the entire system, and thus interrupting service. With a continuance of such conditions it almost invariably happens that apparatus and other cables are damaged. Finally, the arcing ground forms into a short circuit and then a more or less widespread interruption is caused by the operation of overload circuit breakers by the excessive currents which flow in the short circuit. Furthermore, great damage is liable to result to other lines in the neighborhood of the faulty one.

The apparatus which is herein described is designed to perform the following useful functions: First, to test the system to discover incipient faults in the insulation at a time of the day, night, or week most favorable to the system for such tests, for example, when the load is light and several spare feeders are available; second, within a small fraction of a second after the development of a fault to locate on which one of several feeders the fault has occurred and also to indicate the phase at fault; third, to suppress arcing grounds and thus, suppress all the dangerous surges which are thereby produced; fourth, to give an added protection to the most important piece of apparatus on a system, namely, the generator, during the brief interval that is necessary for the arcing ground suppressor to operate.

Up to the present, in the methods described for localizing faulty feeders, no account has been taken of the fact that the grounding currents on a system are seldom constant. Therefore, apparatus which is designed to operate or not operate according to the value of the grounding current becomes unreliable in actual practice. Some devices if made sensitive will produce false operations when the accidental currents to ground are heavy. If such devices are made non-sensitive then the proper localizer will not operate when the ground is of such a nature as to take the minimum of current. I have found by experimental tests that these grounding currents may easily vary in the ratio of ten to one. Recognizing these conditions, the type of relay shown in the accompanying drawing has been designed to make the selection of the faulty feeder independent of the absolute value of a grounding current. This is done by balancing a force produced by the currents in one feeder against that produced in another feeder or other feeders. No matter what the conditions of arcing ground are, the relative increase of current in one feeder has a proportional increase in all the other feeders. However, if the forces engendered are caused to operate on a common element, the common element will move in the direction of the strongest force.

In the accompanying drawing, which forms a part of this specification, there is illustrated diagrammatically a system of distribution involving my invention.

Figure 1 illustrates diagrammatically a system of distribution including a generator, bus bars and three feeders with apparatus involving my invention attached thereto. Fig. 2 illustrates diagrammatically parts of a localizer adapted for use with four feeders.

Before proceeding to describe the other parts of this system of protection, I shall describe more in detail the relations of the circuits to the localizer as they are shown in Fig. 1. In this description I shall designate the feeders as A, B and C, and shall follow this nomenclature through with corresponding numbers. The particular system illustrated is a three-phase system and the phases I shall designate as $x$, $y$ and $z$. $A^1$ is a three-phase transformer or a group of three single-phase current transformers, such as those used for instruments, the windings of which are so related and connected that no current is produced in the leads to the electromagnets, later described, under normal balanced operating conditions. $B^1$ is a corresponding group of current transformers on cable B, and $C^1$ for cable C. These transformers may be the standard instrument transformers also supplying the instruments, by which means it is possible to avoid the expense of special transformers. As far as the protective features are concerned each group of transformers may be replaced by any transformer or group of transformers producing the desired results on the attached solenoids or electromagnets. By so connecting the current transformers, I obtain a resultant current from each feeder which is independent of load current no matter how unbalanced such load current may be. As long as the current coming out one phase returns over one or both of the other phases there will be no resultant current produced. One side of each of the secondary circuits may be grounded in order to give safety against shock. Each of the transformer circuits is connected to an electromagnet or solenoid in the manner indicated; these electromagnets are shown at $A^2$, $B^2$ and $C^2$. Since under normal conditions of operation the algebraic sum of the three currents in the three transformers on any feeder is equal to zero, no current under such conditions will pass through the electromagnets $A^2$, $B^2$ and $C^2$. When, however, a ground takes place in the system, the electrostatic currents in the transformers of these three phases become unbalanced and there is a resultant current in the electromagnets $A^2$, $B^2$ and $C^2$, the grounded feeder giving the greatest current. This will be explained in detail later. The three electromagnets $A^2$, $B^2$ and $C^2$ have their axes spaced 120° apart and point to a common center. At this common center an armature 4 is placed. This armature is mounted on a freely moving pendulum pivoted at the upper end at 5. Under this condition of design, no matter what the absolute values of the currents are in the electromagnets $A^2$, $B^2$ and $C^2$, the electromagnet giving the strongest pull will draw the armature in its direction. The apparatus being arranged in this manner, is so independent of absolute values, that it may be made as sensitive as desirable and is independent of the erratic changes in grounding current. These are the important features referred to above and are not applicable to a ground localizer alone but to localizers of various conditions.

It will of course be understood that it is essential that the solenoids produce equal stresses on the armature on the occurrence of a fault on the system elsewhere than on the feeders to which the solenoids are attached. This may be accomplished in various ways as by using different numbers of turns on the solenoids, differently positioning the solenoids relatively to the armature, using different numbers of turns on the transformer, etc. I prefer to construct the coils $A^2$, $B^2$ and $C^2$ with the numbers of turns therein inversely proportional to the electrostatic capacity of the feeders to which they are respectively attached.

Prior to the occurrence of a ground the electrostatic currents flowing on each feeder through its group of transformers balance and hence the transformers tend to send no current through the attached electromagnet. On the occurrence of a ground on one phase, however, that phase throughout the entire system assumes earth potential and there is no longer an equal exchange of charging current between the phases. In other words, the currents in the three phases on each feeder will be unbalanced, causing a difference of potential at the terminals of the transformers. In the feeder that is grounded, there is more unbalanced current than in any of the other feeders connected to the bus bars. It should be noted that the grounding current of all the non-grounded feeders has to flow into the bus bars through their respective transformers, and that all these currents combine and flow out through the transformer of the grounded feeder to the earth. This in itself produces a differentiation between the cables, i. e., a greater unbalancing in the grounded feeder than in any other. It is understood that the phenomena on grounding is not simple, but this short explanation of what I now believe takes place is sufficient for the purposes of this specification. Although the actual conditions existing at any instant are difficult to explain, there is no question about the result; all the groups of transformers are in the unbalanced condition, and the group on the grounded cable is the most unbalanced, with the result of a selection in the movement of the armature 4. The free moving pendulum is extended beyond the armature 4 so that in its movement toward an electromagnet it will engage with a local circuit contact which causes an indication by some sort of signal which feeder is grounded. The three local circuit contacts are numbered, corresponding to the electromagnets $A^5$, $B^5$ and $C^5$, and the signal indicators $A^6$, $B^6$ and $C^6$. The circuits for these indicators are completed through a battery or other source of electrical energy 7, and the suspension point 5. The signal devices $A^6$, $B^6$ and $C^6$ may be so arranged that when the signal is once made it remains even after the contact at any one of the contacts $A^5$, $B^5$ or $C^5$ is broken. A simple device for this purpose is a drop indicator, although any other suitable indicator may be used. The devices $A^6$, $B^6$ and $C^6$ may, however, be relays in local circuits for operating more distant signals, switches or any other desired devices. Surges of short duration may occur on the system from various causes and the localizer should be so adjusted that while it will respond to a true ground, though an arcing one, it will not respond to these surges of short duration. In other words, a time element should be provided in the localizer. This time element may be brought in by a proper adjustment of the length of the pendulum and by the relative location of the magnets with reference to the armature 4. It will be understood that the adjustments should be such that while the localizer will not respond sufficiently to close the contacts $A^5$, $B^5$ or $C^5$ on the occurrence of transitory surges of short duration, such as course around the system at various times due to switching, dropping load, etc., it will operate and close these contacts on the occurrence of a fault before the arcing ground suppressor can ground the system.

I have now described how my novel localizer or selecting device operates on a system of distribution comprising three feeders. This type of localizer is especially applicable to systems of distribution comprising radial feeders, that is feeders that are only connected to a common point or station at one end. When more feeders are used, for example four, the arrangement of the coils for localizing the ground is shown in Fig. 2. It will be seen in this case that the oppositely placed electromagnets such as 8 and 10 will cancel each other's effect entirely if the forces are equal, and assuming the feeder connected to either electromagnet 9 or 11 is grounded, there will be a resultant force in the direction of the electromagnet corresponding to the grounded feeder. There are four contacts 12, 13, 14 and 15, corresponding to the electromagnets, and having the same physical relation thereto as already described with reference to Fig. 1. It will be understood from this how my system of balancing out currents may apply to more than four feeders, The function then, of the localizer is to instantly show which feeder is at fault.

We now come to the suppressor of the arcing ground which is first formed on the development of a fault. An arcing ground produces surging on the system and hence it is necessary to eradicate the arc as soon as possible. Any device which eradicates the arc by dead grounding or otherwise, is broadly suitable but I prefer to use the device shown diagrammatically in Fig. 1 which forms the subject-matter of my prior applications, Serial No. 492,846 and No. 597,405. The particular device illustrated has already been described in detail in my application, Serial No. 597,405, and I will therefore here confine myself simply to the principle of its operation. There are two parts to this device: First, a phase selecting relay operative to select the phase of the system grounded; second, three single phase switches capable of connecting any one phase to ground either temporarily (opening the ground after a certain period of time if the arc is extinguished) or permanently, if the arc occurs again or is persisting. The phase selecting relay may be electromagnetically operated as disclosed in my pending application for Letters Patent Ser. No. 492,846, or electrostatically operated but, for purposes of illustration, that shown in Fig. 1 is operated electrostatically. There are three fixed electrostatic plates, $x^{16}$, $y^{16}$ and $z^{16}$. These plates exert a force on movable plates $x^{17}$, $y^{17}$ and $z^{17}$. The three movable plates are attached to a common center, 18, which is a part of a pendulum supported at some point, as 19. When the forces between the electrostatic plates of one phase weaken by grounding, the other two phases are strengthened relatively and drag the contactor 18 over against one of the three contacts 20, 21 or 22 to engage that contact corresponding to the phase of the system at fault. The closing of this contact closes a circuit to selectively operate that oil switch corresponding to the faulty phase, the oil switches with their accompanying mechanism being inclosed at 23. The proper oil switch thereby closes to dead ground the faulty phase of the system and thus, extinguishes the accidental arc which has occurred on that phase at some unknown point on the system and prevents destructive surging. I have provided, therefore, a means for indicating the phase of the system at fault, for by observing either the position of the phase selective relay or the position of the grounding switches, an indication of the phase at fault is clearly given. Since this suppressor is on the bus bars, it relieves the armature 4 of the localizer but the signal or other mechanism on the corresponding feeder having already responded gives an indication of the faulty feeder. Thus I have provided a means for selectively indicating the occurrence of a ground on any feeder and also means for indicating the phase of the feeder grounded.

It will be understood that if an operator does not care to know, for some reason, the phase of the system at fault and locates the phase selective relay and grounding switches in a remote place or completely incloses the same so that no indication is given of the phase at fault, that the phase at fault is then merely selected and the proper grounding switch operated without giving an indication. I, therefore, do not wish to be restricted to means for selectively indicating the faulty phase but intend by the word "selecting" to cover this operation of the phase selective relay and its switches irrespective of whether any indication is made or not.

I have now described the method of localizing the fault and the method of suppressing it, and I will next describe the combination of apparatus for giving protection against the surges which occur during the brief time required for the operation of the suppressor. This apparatus includes an electrolytic cell or cells 26 connected between the neutral 24 of the generator and the ground 25. The cell may be an aluminum one similar to those used as lightning arresters but no series gap is required. It is well known in the art that grounding the neutral of a system gives a great relief to the static strains in the system. If, however, this neutral is grounded through no resistance, then every ground on the line results in a short circuit, and an interruption of service. This is intrinsically an objectionable condition. If the neutral is grounded through a high resistance, then the protective value is very greatly lost by the obstruction of the oscillating currents in the resistance. This application of the electrolytic cell to the neutral gives all the advantages of the grounded system in absorbing abnormal potentials, and at the same time has none of the disadvantages of short circuits that occur with the neutral grounded through no resistance. Since it is the natural characteristic of the aluminum film to become dissolved in its electrolyte, it is necessary to supply a charging device as shown by the switch 27 for renewing the film from time to time. I have now added to the system of protection a device for absorbing the surges during the brief intervals of time that these surges take place.

I now turn to the device for the development of the incipient fault, which device may coöperate with the other devices to develop a fault at a time when no great embarrassment will be caused and when it may be readily corrected. This device consists of some sort of a direct current source 28, as a generator or a rectifier, which produces a DC potential which is superimposed on the AC potential waves on the system. This source 28 is connected between ground and some neutral point of the system by means of the switch 30. This neutral of the system may be an artificial one 29 produced by a combination of three reactances 30, 31 and 32 connected to the respective phases $x$, $y$ and $z$, or may be the neutral of the generator. The impression of this direct current on the system requires very little energy and combines with the alternating currents from the generator to produce the high potentials required to strain the insulation for test. It is a well known fact that any piece of insulation can stand a greater direct current potential than it can alternating potential. Therefore, the testing of such a system when it is dead, by direct current, is not an adequate test, but the imposition of the direct current potential on the system when operating under alternating currents has the advantages of an alternating current test. Such tests may be made by alternating currents but such testing requires not only a very large kilovolt-ampere capacity in the testing device but also engenders possible combinations with the alternating current of the system to give variable voltages, and combinations with the electrostatic capacities to give resonance, both of which are objectionable. The system I propose takes advantage of the alternating current furnished by the generator to give the effects on the insulation of alternating currents and at the same time requires very little energy from the superimposed direct current potential from the generator 28. This developer of faults then completes the system for the preservation of continuity of electric service.

The attachment of the protective features to the system provides constant protection for faults which may develop at any time; the combination therewith of the testing means I regard as a desirable feature, since by this means, as has been before intimated, the system may be tested out at some time when there is but little demand being made upon it, and any faults which are near the point of development, developed at that time. The development of a fault under test causes the operation of the protecting devices, and thus protects the system against the injury which it might sustain the same as though the fault developed naturally. If necessary, the faulty feeder may be cut out and other provision made for supplying the portion of the load normally supplied by that feeder, before the demand can become great. The fault may even be located and the feeder repaired before its service is again required.

What I claim as new and desire to secure by Letters Patent of the United States, is:—

1. In combination with a system of distribution, of means including a plurality of feeders for impressing a testing potential on the system to develop incipient faults thereon, and means for selecting the feeder upon which a fault is developed.

2. In combination with a system of distribution, of means for superimposing a potential on the operating potential of the system to develop incipient faults, a localizer of a fault developed thereby, and means for protecting the system against surges produced by said fault.

3. The combination with an alternating current system of distribution, of means for superimposing a direct current potential on the operating potential of the system to develop incipient faults, a localizer of a fault developed thereby, and means for protecting the system against surges produced by said fault.

4. The combination with a system of distribution, of means for impressing a testing potential on the system to develop incipient faults, a localizer of a fault developed thereby, and means for extinguishing the arc developed at the fault.

5. The combination with a system of distribution, of means for superimposing a potential on the operating potential of the system to develop incipient faults, a localizer of a fault developed thereby, and means for extinguishing the arc developed at the fault.

6. The combination with an alternating current system of distribution, of means for superimposing a direct current potential on the operating potential of the system to develop incipient faults, a localizer of a fault developed thereby, and means for suppressing the arc developed at the fault.

7. The combination with a system of distribution, of means for impressing a testing potential on the system to develop incipient faults, a localizer of a fault developed thereby, means for extinguishing the arc developed at the fault, and means for protecting said system from surges produced by the arc during the interval between the development of the arc and its extinguishment.

8. The combination with a system of distribution, of means for superimposing a potential on the operating potential of the system to develop incipient faults, a localizer of a fault developed thereby, means for protecting the system against surges developed by said fault, and means for extinguishing the arc developed at the fault.

9. The combination with an alternating current system of distribution, of means for superimposing a direct current potential on the operating potential of the system to develop faults, a localizer of a fault developed thereby, means for protecting the system against surges due to said fault, and means for suppressing the arc developed at the fault.

10. The combination with a system of distribution, means for developing incipient faults on said system, a localizer of a fault developed thereby, and means connected between a neutral point on the system and ground for completing a path of substantially low resistance from said neutral point to ground to protect the system against surges developed by said fault.

11. The combination with a system of distribution, means for testing the system to develop any incipient fault therein, a localizer of a fault developed thereby, and means connected between a neutral point on the system and ground for protecting said system from surges developed by said fault, and means completing a path of substantially low resistance from said neutral point to ground on the occurrence of a predetermined difference in potential between the neutral point and ground and for opening the path again on the occurrence of a predetermined potential.

12. The combination with a system of distribution, means for testing the system to develop incipient faults, a localizer of a fault developed thereby, and means connected between a neutral point on the system and ground for protecting said system from surges developed by said fault, said means substantially preventing the passage of current when subjected to a potential below a predetermined value and offering substantially no resistance to the passage of current when subjected to a potential above that value.

13. The combination of a system of distribution, of means for testing the system to develop any incipient fault therein, a localizer of a fault developed thereby, a connection to a neutral point on the system, a connection to ground, and an electrolytic cell between the connections for protecting said system from surges produced by said fault.

14. The method of testing an alternating current system which consists in subjecting the system to the operating alternating current potential, superimposing thereon a direct current potential thereby developing any incipient fault on the system, localizing the fault, and subsequently extinguishing the arc developed at the fault.

15. In an alternating current system of distribution comprising a plurality of feeders, the method of protecting the system from incipient faults on any feeder which consists in impressing a direct current potential upon the operating alternating current potential to develop the fault, and utilizing the effect of the unbalanced electrostatic charging current on the feeders to selectively indicate the feeder upon which the fault is developed thereby.

16. In a system of distribution including a plurality of feeders, means for extinguishing the arc formed on the development of a ground having a substantially definite time period of operation, and a localizer for indicating the location of the ground having a shorter substantially definite time period, allowing the operation of the localizer prior to the operation of the arc extinguishing means.

17. In a system of distribution including a plurality of feeders, means for eliminating the arc formed on the development of the ground operating after the expiration of a substantially definite period of time, and a localizer for indicating the location of the ground operating after the expiration of a substantially definite period of time and prior to the operation of the arc eliminating means.

18. In a system of distribution including a plurality of feeders, means for eliminating the arc formed on the development of a ground on the system operating after a substantially definite period of time after the occurrence of the ground, and a localizer for locating the ground capable of operating only on the continuation of abnormal conditions for a substantially definite period of time and before the operation of the arc eliminating means.

19. In combination with a system of distribution comprising a plurality of feeders, of means for impressing a testing potential on said system to develop incipient faults therein, and means for selectively indicating upon which feeder a fault is developed thereby.

20. In combination with a system of distribution comprising a plurality of feeders, of means for impressing a testing potential on said system to develop incipient faults, means for selectively indicating upon which feeder a fault is developed thereby, and means for extinguishing the arc developed at the fault.

21. In an alternating current system of distribution comprising a plurality of feeders, the method of protecting the system from incipient faults on any feeder which consists in impressing a direct current potential upon the operating alternating current potential to develop the fault, localizing the fault developed thereby, and subsequently extinguishing the arc developed at the fault.

22. The combination with a system of distribution comprising a plurality of feeders, of means for selectively indicating the occurrence of a ground on any of said feeders, and means for indicating the phase of the feeder grounded.

23. In a system of distribution comprising a plurality of radial feeders, the combination with means for selectively indicating the occurrence of a ground on any of said feeders, and means for indicating the phase of the feeder grounded.

24. In a system of distribution comprising more than two feeders, a combination with means for selectively indicating the occurrence of a ground on any of said feeders, and means for selecting the faulty phase of the feeder grounded to remove said grounded condition.

25. The combination with a system of distribution comprising a plurality of radial feeders, of means for selectively indicating the occurrence of an accidental ground on any of said feeders, a device for selecting the phase of the system grounded, and means operatively related to said device for removing said accidental ground from said system.

26. The combination with a system of distribution comprising a plurality of feeders, of means for selectively indicating the occurrence of an accidental ground on any of said feeders, a device for selecting the phase of the system grounded, and means operatively related to said device for removing said accidental ground from said system.

27. In combination with a system of distribution comprising a plurality of feeders, of means for selectively indicating the occurrence of a ground on any of said feeders, means for operating said indicating means with a delayed action, and a device operated subsequent to the operation of said indicating means to select the faulty phase of the feeder grounded to remove said grounded condition.

28. In combination with a system of distribution comprising a plurality of feeders, of means for selectively indicating the occurrence of a ground on any of said feeders, a phase selective device operated subsequent to the operation of said indicating means to select the faulty phase of the feeder grounded, and means operated in response to said phase selective device for extinguishing the arc produced at the ground.

29. In a system of distribution comprising a plurality of feeders, the method of selectively indicating upon which phase of which feeder a ground occurs which consists in utilizing the effect of the unbalanced electrostatic charging currents of the feeders due to the occurrence of the ground in differential relays to operate one of said relays to indicate the grounded feeder and subsequently utilizing the unbalanced current condition between phases to operate a device to indicate the phase upon which the ground has occurred.

30. In a system of distribution comprising a plurality of radial feeders, the method of selectively indicating upon which phase of which feeder a ground occurs which consists in utilizing the effect of the unbalanced electrostatic charging currents of the feeders due to the occurrence of the ground in differential relays to operate one of said relays to indicate the grounded feeder and subsequently utilizing the unbalanced current condition between phases to operate a device to indicate the phase upon which the ground has developed.

31. In a system of distribution comprising more than two feeders, the method of selectively indicating the feeder and phase upon which a ground occurs consisting in utilizing the effect of the unbalanced electrostatic charging currents of the feeders due to the occurrence of the ground in differential relays to first operate one of said relays to indicate the grounded feeder and subsequently operate another device to indicate the phase of the system upon which the ground occurs.

32. In a system of distribution comprising a plurality of feeders, the combination with means for testing said system to develop incipient faults, a localizer of a fault developed whereby the feeder upon which the fault has developed is indicated, a device operative in response to the fault for selecting the phase of the system grounded, means for extinguishing the arc developed at the fault, and means for protecting the system from surges produced by said fault in the interim before said extinguishing means operates.

In witness whereof, I have hereunto set my hand this ninth day of May, 1912.

ELMER E. F. CREIGHTON.

Witnesses:
HELEN ORFORD,
BENJAMIN B. HULL.

Copies of this patent may be obtained for five cents each, by addressing the "Commissioner of Patents, Washington, D. C."